United States Patent [19]

Halter

[11] Patent Number: 5,158,673
[45] Date of Patent: Oct. 27, 1992

[54] OIL SKIMMER APPARATUS

[75] Inventor: Harold Halter, New Orleans, La.

[73] Assignee: Halter International, Inc., New Orleans, La.

[21] Appl. No.: 671,124

[22] Filed: Mar. 18, 1991

[51] Int. Cl.$^5$ .............................................. E02B 15/04
[52] U.S. Cl. ................................... 210/94; 210/242.3; 210/923
[58] Field of Search ................. 210/94, 95, 109, 122, 210/135, 242.3, 776, 923

[56] References Cited

U.S. PATENT DOCUMENTS

| | | | |
|---|---|---|---|
| 3,578,171 | 5/1971 | Usher | 210/242.3 |
| 3,606,912 | 9/1971 | Fox | 210/94 |
| 3,708,070 | 1/1973 | Bell | 210/242.3 |
| 3,737,040 | 6/1973 | Brydoy et al. | 210/242.3 |
| 3,966,614 | 6/1976 | Ayers | 210/242.3 |
| 3,966,615 | 6/1976 | Petchul et al. | 210/776 |
| 4,100,072 | 7/1978 | Uchida et al. | 210/242.3 |
| 4,203,842 | 5/1980 | Di Perna | 210/242.3 |
| 4,360,430 | 11/1982 | Ellis | 210/242.3 |
| 4,554,070 | 11/1985 | Jordan | 210/242.3 |

FOREIGN PATENT DOCUMENTS 5411 11/1979 European Pat. Off. .

Primary Examiner—Stanley S. Silverman
Assistant Examiner—Christopher Upton
Attorney, Agent, or Firm—Larson & Taylor

[57] ABSTRACT

The oil skimmer craft removes oil spilled on a body of water. A set of intake bellows project forward from the craft for collecting oil-laden water and for drawing the oil-laden water into a separation tank within the craft. An adjustable depth pump suction is provided for pumping floating oil from the separation tank into a separate tank to thereby leave only unpolluted water remaining in the separation tank. An observation compartment is provided so that an operator can view the thickness of oil in the separation tank and adjust the depth of the pump suction for optimum separation efficiency. The cleaned water is drawn out of the separation tank through suction tunnels in the bottom of the craft. A series of skimmer craft can be deployed in tandem.

6 Claims, 11 Drawing Sheets

OIL SKIMMER APPARATUS

FIELD OF THE INVENTION

The invention is directed to an oil skimmer apparatus for collecting oil or other liquid pollutants spilled on a body of water.

BACKGROUND OF THE INVENTION

One of the most serious problems to the environment is the damage caused by oil spills on the lakes, seas, and oceans. The amount of damage to the environment and the cost of clean-up increases dramatically if the oil is allowed to disperse over a wide area. As the oil disperses, the lightest components of spilled oil evaporate leaving a thick residue of gel or tar which is particularly difficult to clean-up. Thus it is important that oil removal devices are quickly deployable and are capable of removing both light oil components which float on top of the water and thick oil components which float below the water surface.

Oil, once skimmed from the water, must be stored for subsequent disposal. Storage is typically provided by barges towed to the vicinity of the oil spill. Since the total storage space on a barge is limited, it is important that the storage space be efficiently used. Thus, oil should be carefully separated from sea water, such that the barges store only oil and do not waste storage space storing sea water.

Various devices and methods have been developed for cleaning oil spills with varying degrees of success. Patented examples include: U.S. Pat. Nos. 3,847,816 (DiPerna); 4,182,679 (Van Hekle); 4,477,348 (Ayers et al); 4,372,854 (Szereday); 4,487,694 (Brandt et al); 4,514,299 (Ayroldi); 4,588,501 (Jordan); 4,690,093 (Lundin); 4,795,567 (Simpson et al); 4,921,605 (Bagnis et al). However, none of prior art techniques provide a quickly deployable oil skimmer capable of efficiently collecting spilled oil and separating the oil from sea water.

SUMMARY OF THE INVENTION

In accordance with the invention a skimmer craft is provided for collecting and separating oil and other liquid pollutants spilled on a body of water. The skimmer craft includes skimming means for collecting polluted water from the body of water and for conveying the polluted water into a separation tank. Pump means are provided for pumping water from the lower portion of the separation tank, thereby leaving floating pollutants in the separation tank. Pump means are provided for pumping the floating pollutants in the separation tank into a storage facility. Manual control means are provided for allowing an operator to control the depth of the water and an observation compartment is provided for allowing the operator to view the depth of floating pollutants in the separation tank to adjust the depth of water and to pump only floating pollutants from the separation tank leaving a remainder portion of substantially clean water.

Advantageously, the skimmer craft further includes turbine jet pumps or centrifugal pumps for pumping the remainder portion of substantially unpolluted water from the separation tank.

Furthermore, the skimming means can include bellows attached to the craft and positionable in the body of water with the craft capable of moving through the water at a variable velocity. Manual controls allow the operator to control the velocity of the craft thereby controlling the rate at which polluted water is collected through the bellows.

The observation window is adjacent to the separation tank. The separation tank includes lights positioned below the level of polluted water for illuminating the polluted water and thus enabling the operator to more clearly see the depth of liquid pollutants in the separation tank.

Thus the invention provides a quickly deployable skimmer craft having an efficient system for collecting oil-laden water from a body of water. The craft includes the capability to separate the oil-laden water into two components: oil and substantially unpolluted water. The unpolluted water is returned to the sea, whereas the collected oil is stored for subsequent disposal.

Other features and advantages of the invention will be set forth in, or be apparent from, the detailed description of the preferred embodiments which follows.

DETAILED DESCRIPTION OF THE PREFERRED EMBODIMENT

Figure 1:
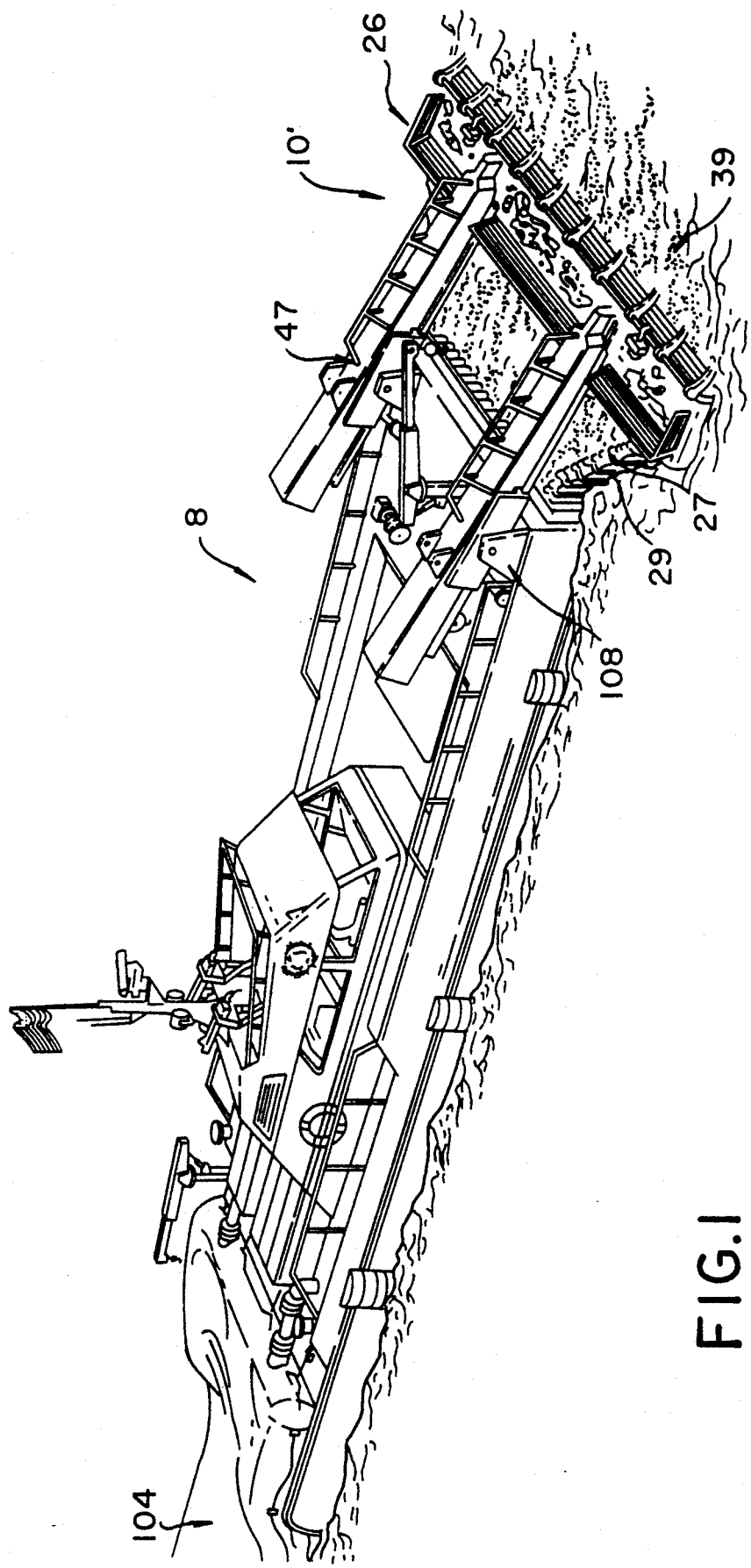
FIG. 1 shows a perspective view of a skimmer craft constructed in accordance with a preferred embodiment of the invention, including an intake system and a storage receptacle.

Referring to FIGS. 1-6, a preferred embodiment of the invention will now be described. FIG. 1 shows an oil skimmer craft 8 for collecting oil or other liquid pollutants spilled on a body of water such as a lake, sea or ocean.

Skimmer craft 8 includes an intake system 10 for scooping oil-laden water from the surface of the sea. The skimmed sea water includes both floating oil and sea water. After collecting the oil-laden sea water, the skimmer craft 8 separates and removes the floating oil from the sea water thereby leaving substantially unpolluted sea water. The craft returns the unpolluted seawater to the sea and pumps the recovered oil into a neoprene bag 104 or other storage means for subsequent disposal.

Figure 2:
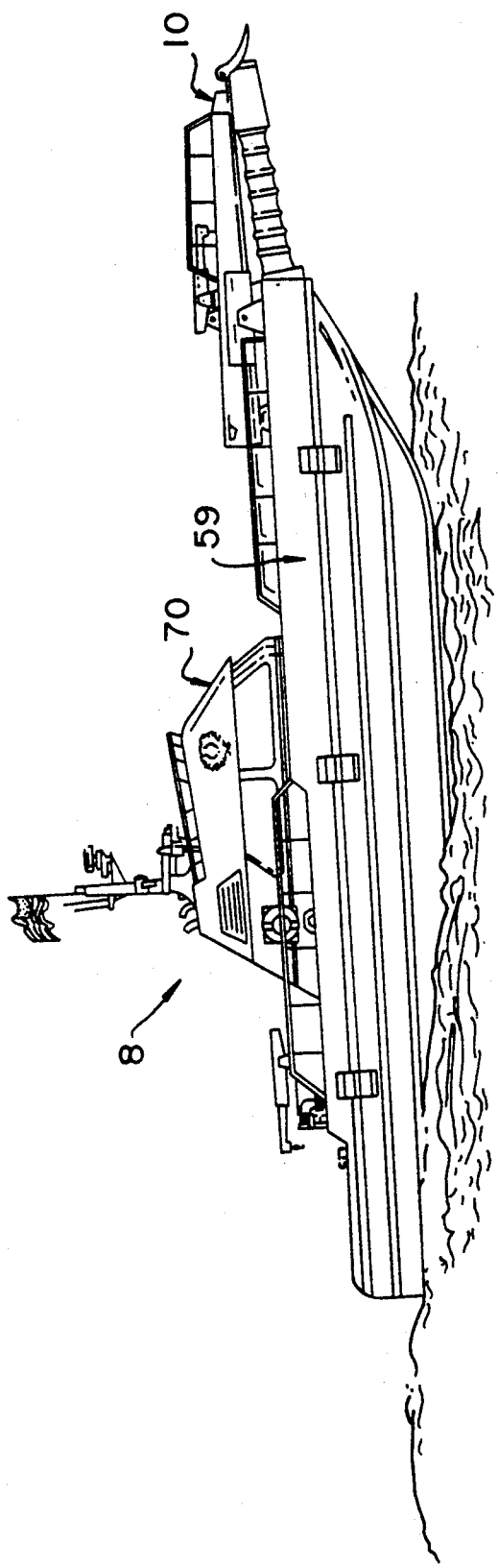
FIG. 2 shows a perspective view of a skimmer craft constructed in accordance with an alternative embodiment of the invention, including an intake system raised for transport.

FIG. 2 shows skimmer craft 8 with an intake system 10' of an alternative design, described in detail with reference to FIGS. 4 and 5 below. In the embodiment of FIG. 2, intake system 10' is raised for transport. No storage means is shown.

Although skimmer 8 can be advantageously used for any spill of floating liquid pollutants in any navigable body of water, for clarity this description will hereinafter refer only to oil spills at sea.

Figure 3:
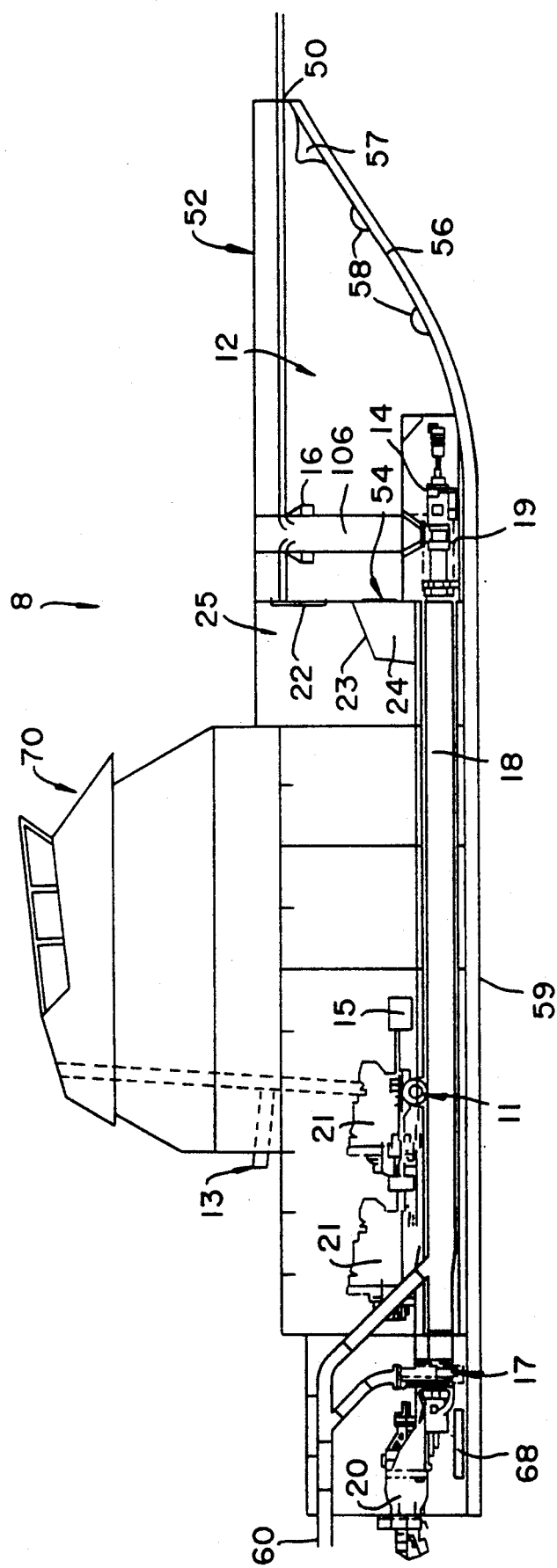
FIG. 3 shows a side elevational view partially in section of a portion of an alternative embodiment of the craft of FIG. 1, excluding the intake system and storage receptacle.
Figure 4:
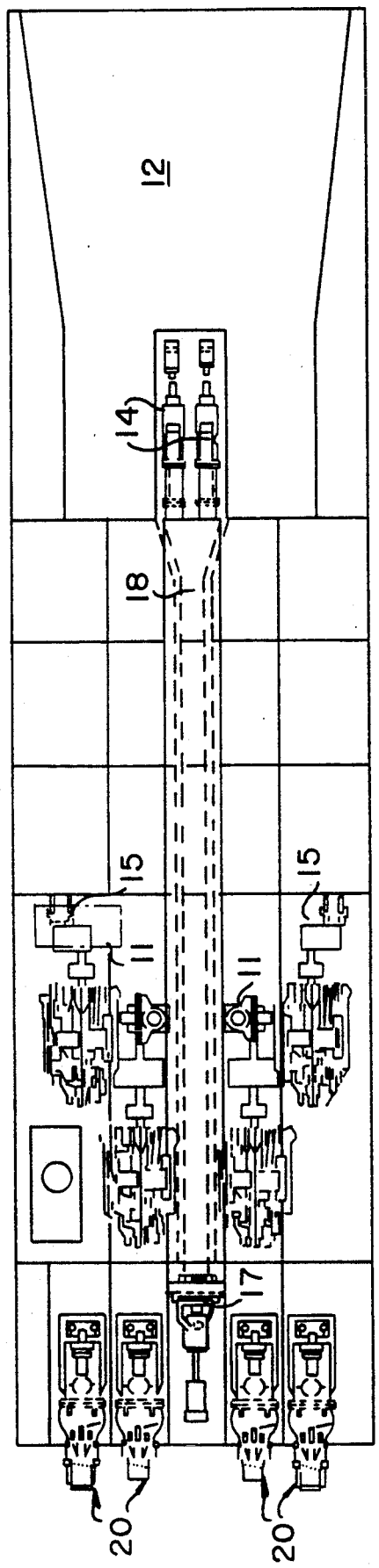
FIG. 4 shows a top plan view of a portion of the embodiment of FIG. 1, excluding the intake system.
Figure 5:
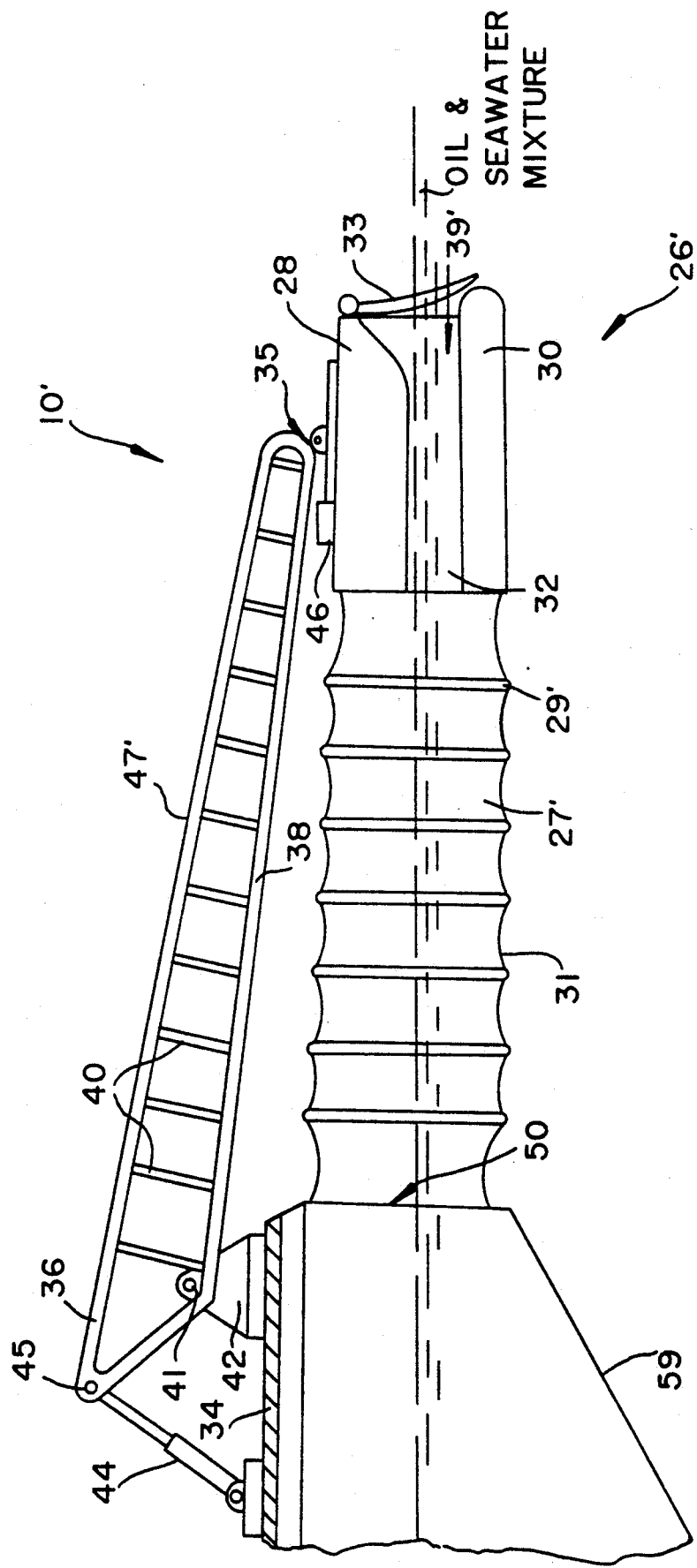
FIG. 5 shows a side view of the intake system of the embodiment of FIG. 2.

Referring to FIGS. 3 and 4, skimmer craft 8 is shown in detail, excluding intake system 10 or storage bag 104. Oil-laden water is received from the intake system through an intake port 50 and is passed into a separation tank 12. A plurality of positive displacement pumps 14 and centrifugal pumps 17 pump oil from separation tank 12 into a suction/discharge pipe 18 for subsequent disposal through an exit port 60 to a storage means. Pumps 14 and 17 pump oil from storage tank 12 through a variable depth intake port 16 positioned within storage tank 12 and mounted on a vertical shaft 106 connected to discharge pipe 18. As will be discussed in detail hereinafter, variable depth intake port 16 is raised or lowered within the storage tank 8 in response to the level and depth of oil contained therein.

Positive displacement pumps 14 are powered by hydraulic power derived from hydraulic pumps 15 driven by main drive engines 21 of skimmer craft 8. Gear boxes (not shown) are provided to allow main drive engines 21 to simultaneously provide hydraulic power to power both positive displacement pumps 14 and drive turbine jet pumps 20.

Displacement pumps 14 are removable and can be replaced by a single alternate pipe 19, shown with broken lines in FIG. 3. In this alternative configuration, alternate pipe 19 connects vertical shaft 106 directly to discharge pipe 18 thus allowing centrifugal pumps 17 to pump directly from separation tank 12 through port 16.

An observation compartment 25 adjoins separation tank 12. A transparent window 22 provided between separation tank 12 and observation compartment 25 allows an operator seated at a control console 24 to view the depth of oil in separation tank 12. Manual controls 23 are provided for the operator to adjust the depth of intake port 16 within tank 12 to efficiently pump only oil, thus leaving unpolluted sea water remaining in separation tank 12. A plurality of sea water pumps 11 pump remaining unpolluted sea-water from tank 12 through a discharge pipe (not shown) and finally through an overboard discharge 13 to the sea.

Referring again to FIG. 3, separation tank 12 and the means for pumping sea water and oil from separation tank 12 will now be described in detail. Separation tank 12 includes intake port 50 for receiving oil-laden water from intake system 10 (shown in FIG. 1). Separation tank 12 is located in the bow of skimmer craft 8 and is bounded by a ceiling 52, a rear bulkhead 54 and an angled floor 56. Angled floor 56 is shaped to conform to the hull 59 of skimmer craft 8 thus allowing for the largest possible separation tank 12 to be enclosed within the skimmer craft. An oil deflector 57 is provided near intake port 50 to deflect entering oil upward to prevent the entering oil from mixing with water already contained in separation tank 12.

Observation compartment 25 is provided directly adjacent to, and aft of, separation tank 12. Rear bulkhead 54 of separation tank 12 comprises the forward bulkhead of observation compartment 25. Transparent window 22 allows an operator seated at the control console 24 to directly view the contents of separation tank 12. Transparent window 22 is positioned at a height such that, in use, at least a portion of window 22 is below the surface of liquid contained in separation tank 12. The operator can therefore directly view the oil in separation tank 12. A plurality of lights 58, provided on the lower inner surface of separation tank 12, illuminate the contents of separation tank 12.

The embodiment of intake system 1 shown in FIG. 1, will now be described with reference to FIG. 1.

Intake system 10 includes a wide-mouthed sea sled 26 with intake port 39. Sea sled 26 is joined to hull 59 of skimmer craft 8 by a plurality of flexible side bellows 27 supported by a plurality of support ribs 29. Sea sled 26 is supported and positioned by booms 47.

Oil laden sea water is gathered by sea sled 26 through intake port 39. Flexible side bellows 27 funnel the oil laden sea water into intake port 50. The amount of oil-laden water received by sea sled 26 is controlled by varying the depth of intake port 39. Conventional inflatable bags (not shown) are provided within the body of sea sled 26 to vary the depth of sea sled 26 to thereby control the amount of oil-laden water received through intake port 39.

Flexible side bellows 27 are narrower near intake 50 than near sea sled 26 thus allowing a wide swath of oil-laden water to be drawn from the sea surface and funneled into separation tank 12.

Booms 47 are mounted on fork mounts 108 of conventional design such that sea sled 26 can be raised or lowered as needed.

Figure 6:
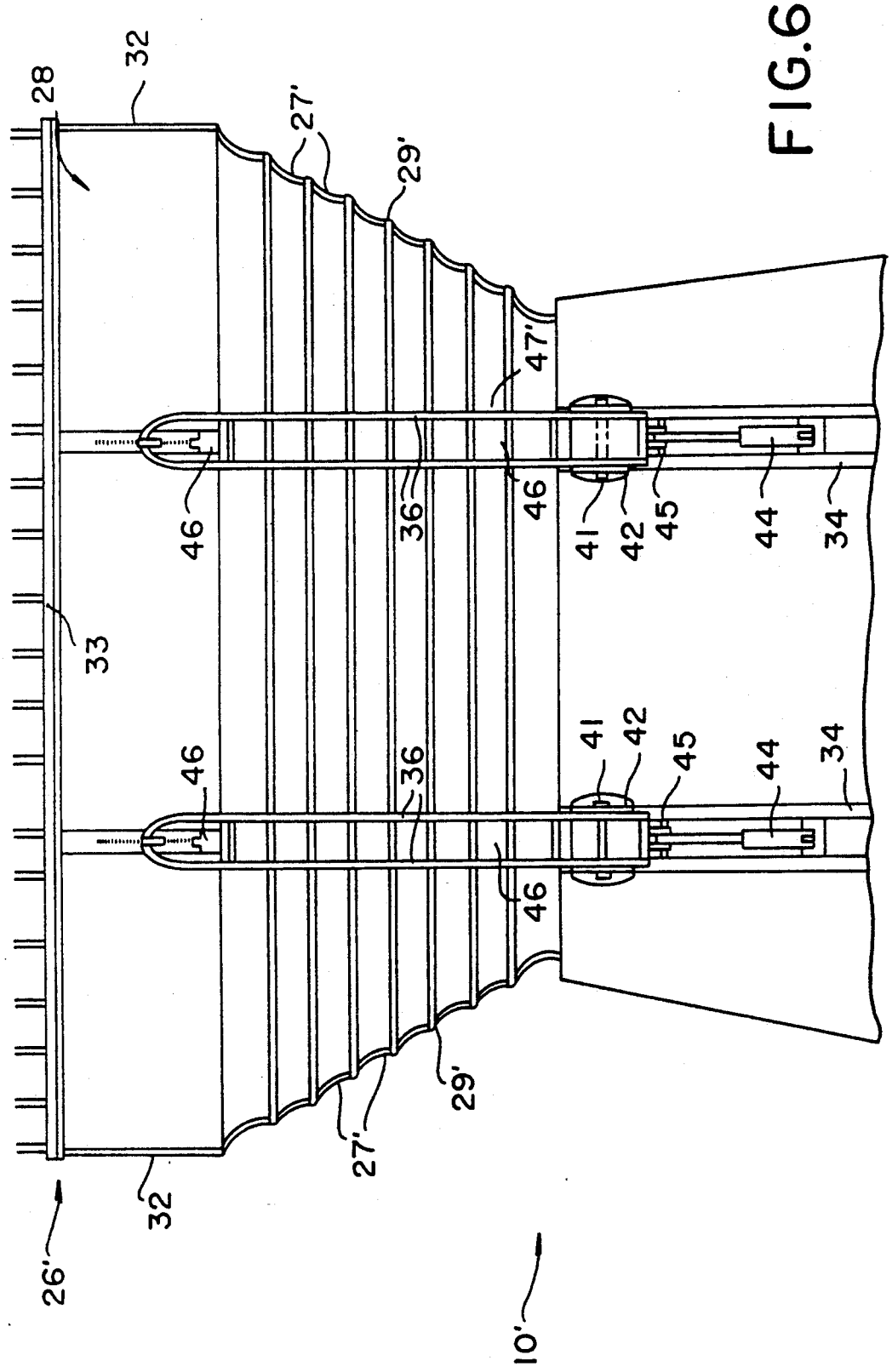
FIG. 6 shows a top plan view of the intake system of FIG. 2.

An alternative embodiment of intake system 10 will now be described with reference to FIGS. 5 and 6. The intake system of FIGS. 5 and 6 is similar to the embodiment of FIG. 1 and like elements are represented with like reference numerals with primes.

Intake system 10' includes a wide-mouthed sea sled 26' comprising an upper planing surface 28, a lower buoyant member 30, end caps 32 and a hydraulic rake 33, which together form an open intake port 39'.

As with the intake system of FIG. 1, sea sled 26' is joined to hull 59 of skimmer craft 8 by a plurality of flexible bellows 27' supported by a plurality of support ribs 29'. However, in contrast to the intake system of FIG. 1, bellows 27' are formed as a complete enclosed funnel with top and bottom sections. The bottom section of bellows 27' comprises bellows floor 31.

Sea sled 26' is positioned by booms 47' comprising upper member 36, lower member 38 and connecting ribs 40.

Flexible bellows 27' and bellows floor 31 funnel the oil laden sea water into intake port 50. The amount of oil-laden water received by sea sled 26' is controlled by varying the depth of lower buoyant member 30. Conventional inflatable bags (not shown) are provided within the body of buoyant member 30 to vary the depth of sea sled 26' to thereby control the amount of oil-laden water received through intake port 39'. The depth of sea sled 26' is further controlled by adjusting the center of gravity of sea sled 26' to thereby tilt sea sled 26' to scoop up more or less of the oil-laden water.

Convolutions formed by flexible bellows 27' and bellows floor 31 create eddies in the intake flow of oil-laden water which force the oil to the surface.

As easily seen in FIG. 6, flexible bellows 27' are narrower near intake 50 than near sea sled 26' thus allowing a wide swath of oil-laden water to be drawn from the sea surface and funneled into separation tank 12.

Booms 47' are raised by contracting two hydraulic rams 44 thus pivoting booms 47 about pivot members 41 and raising sea sled 26' out of the water. Intake system 10' is retractable on boom retraction slides 34, shown in FIG. 6, thus allowing flexible bellows 27' to be contracted against hull 59. When contracted intake system 10' is safely protected from damage that could occur during heavy weather or during high speed transit. Sea sled 26' is deployed by extending retraction slides 34 and reversing the above-described process.

Intake system 10, in either embodiment discussed above, provides for efficient collection of oil-laden sea water. The capability of intake system 10 to float on the surface of the sea independently of skimmer craft 8 allows oil to be collected in rough seas having up to 4 to 6 foot swells.

Returning to FIG. 1, in an exemplary, non-limiting embodiment, skimmer craft 8 has an overall length of 60', a beam of 14'5", and a weight of 14.5 tons. Hull 59 of skimmer craft 8 is of generally V-shaped design to allow skimmer craft 8 to travel at high speeds through rough water. Skimmer craft 8 is piloted from pilot cabin 70 positioned on the deck of skimmer craft 8. Pilot cabin 70 and intake system 10 are removable from skimmer craft 8 to enable skimmer craft 8 to be more easily transported over land for prompt deployment in the vicinity of an oil spill. In a further embodiment, not shown, skimmer craft 8 is separable into two sections for convenient transport over land or for air freight transport.

The embodiment of FIGS. 1–6 provides an efficient system for collecting oil-laden water from the sea and separating the oil from sea water such that only the collected oil is stored for disposal. The sea water collected by the system is returned to the sea.

In use, the oil and water mixture, according to the severity of the oil-spill, form a mixture of predominantly water with a thin oil film to a mixture having almost only oil. The viscosity of such mixtures varies from 0–100,000 centipoise, respectively. Oil skimmer 8 includes various combinations of pumps for effectively pumping any possible oil and water mixtures. The following describes a examples of methods for pumping oil from separation tank 12 for several different oil and water mixtures.

EXAMPLE 1

Mixture of Low Viscosity Oil with Almost No Water

Variable depth pump intake 16 is raised above the level of oil in separation tank 12 and is not used. Hydraulic operated doors 68 are shut and center line turbine jet pumps 20 pump directly from separation tank 12 via suction tunnels 55 and discharge pipe 16 to an external storage means. As oil is pumped out of separation tank 12, additional oil is drawn in through intake system 20. If the amount of oil in separation tank 12 decreases, the speed of the pumps is likewise decreased. Finally, turbine jet pumps 20 are stopped if the depth of oil has been lowered to point such that turbine jet pumps 20 can no longer efficiently pump the oil.

EXAMPLE 2

Mixture of Low Viscosity Oil on Water

Variable depth pump intake 16 is positioned within separation tank 12 by the operator to a depth such that only oil is pumped through intake 16. Displacement pump 14 is replaced with alternate pipe 19. Centrifugal pumps 17 are activated to pump oil from the surface of the water through intake 16 thus leaving sea-water only in separation tank 12. The remaining sea-water is removed by sea water pumps 11 and returned to the sea through overboard discharge 13. The centrifugal pump 17 is hydraulically driven such that its pumping speed can be regulated according to the amount of oil to be pumped.

EXAMPLE 3

Medium Grade Oil with Viscosity Up to 1,000 Centipoise

Skimmer 8 is configured as in Example 2 with centrifugal pump 17 pumping through port 16 and alternate pipe 19. However, to minimize the viscosity of the oil pumped through suction discharge pipe 18, suction/discharge pipe 18 is surrounded by a water jacket (not shown) which is heated by the cooling system (not shown) of the main drive engines 21 and by heat gathered from the exhaust of the main drive engines.

EXAMPLE 4

Heavy Grade Oil with Viscosity over 1,000 Centipoise

Alternative pipe 19 is replaced by positive displacement pump 14. The heated water jacket, referred to in Example 3, is positioned around vertical shaft 106. Variable depth intake 16 is raised or lowered within separation tank 12 by the operator using manual controls 23 to skim the heavy grade oil from tank 12. As the oil is pumped through vertical shaft 106, the oil is heated thus lowering its viscosity. The heated oil is then pumped through positive displacement pumps 14 into discharge pipe 18 where it is further heated before being discharged to an external storage means via exit port 60.

The above examples are merely illustrative of oil and water mixtures likely to be encountered in actual use and illustrative of skimmer pump configurations for use with such oil and water mixtures. Other possible mixtures of oil and water may be encountered and can be effectively separated by varying or combining the steps of the above-described pumping examples.

Figure 7:
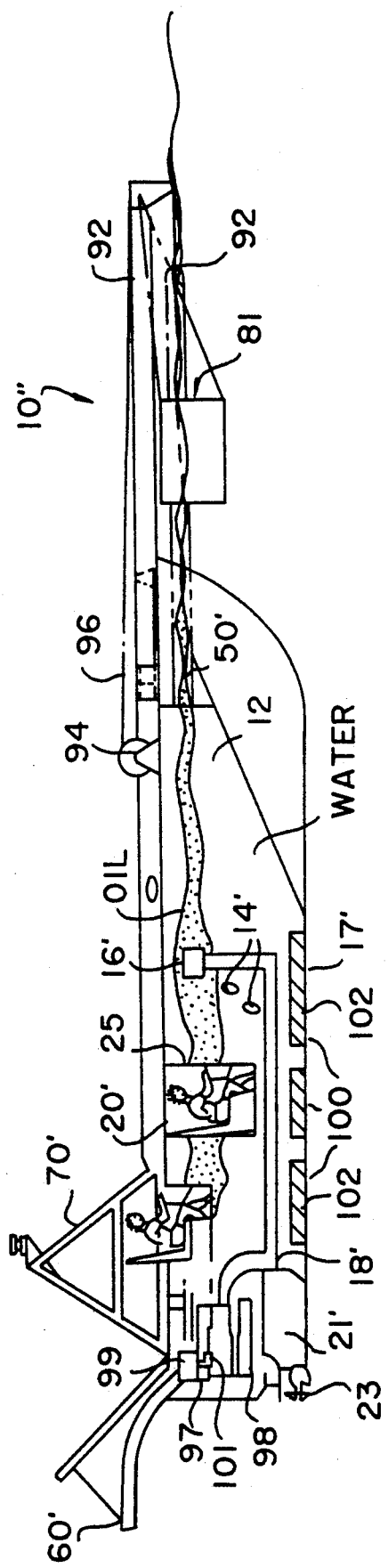
FIG. 7 shows a side plan view of a skimmer craft constructed in accordance with an alternative embodiment of the invention.
Figure 8:
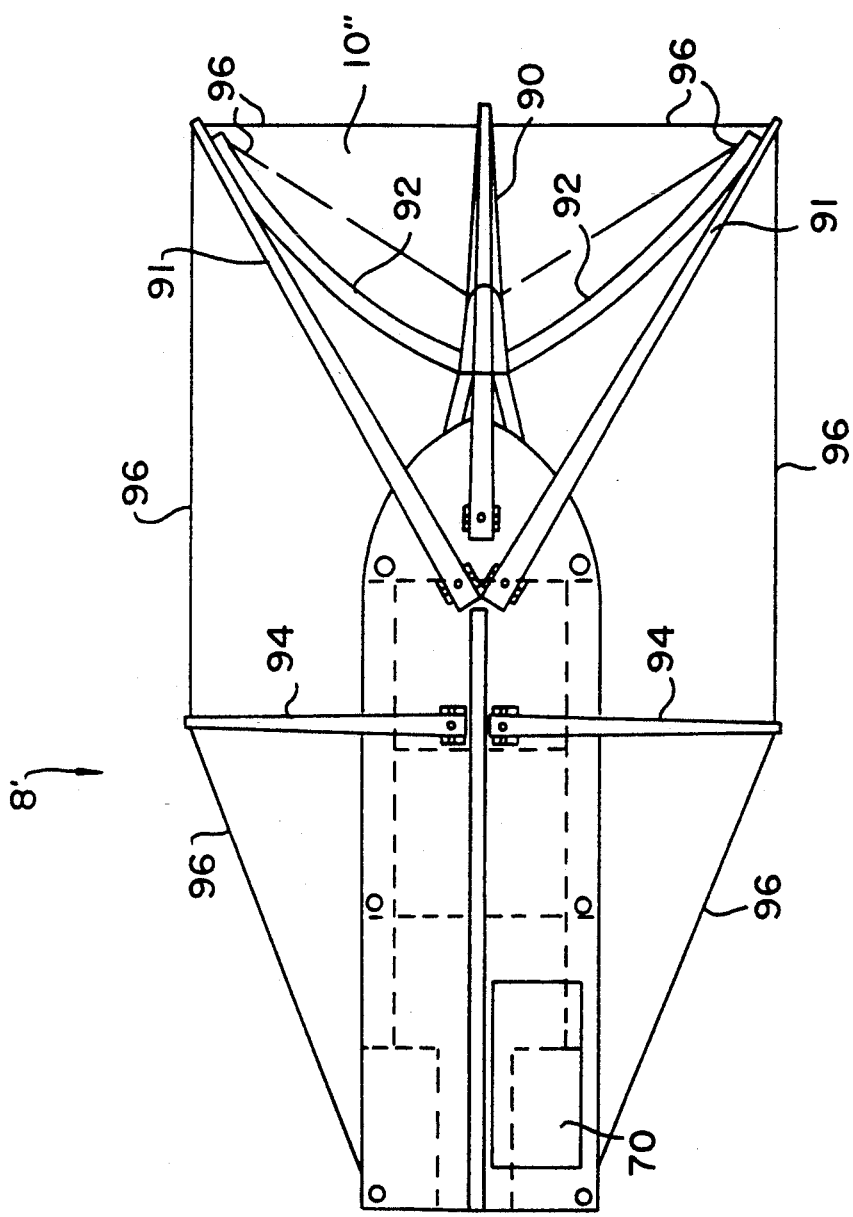
FIG. 8 shows a top plan view of the embodiment of FIG. 7.

An alternative embodiment of the invention is shown in FIGS. 7 and 8. The embodiment of FIGS. 7–8 is similar to that of FIGS. 1–6, and like elements are identified with the same numerals as in FIGS. 1–6 with primes. Only the elements of the alternative embodiment which differ substantially from the corresponding elements in the embodiment of FIGS. 1–6 are described in detail below.

FIGS. 7 and 8 show a skimmer craft 8' with an oil intake system 10" including input port 81 suspended in the water by forward boom 90. Angled booms 91 extend at an angle from the bow of skimmer craft 8' in a substantially V-shaped arrangement. Input hoses 92 are suspended in the water beneath angled booms 91 and extend from the outward end of angled booms 92 to the sides of input port 81. Hoses 92 and input port 81 both float near the surface of the water such that oil-laden water is drawn into input port 81. Hoses 92 project forward from input port 81 to provide a V-shaped scoop for gathering oil-laden water and conveying the oil-laden water into input-port 81. A pair of opposing side booms 94 provide additional support for intake system 10" via guy wires 96. Guy wires 96 connect the ends of the booms 90, 91, and 94 to each other and to skimmer craft 8', in a configuration shown most clearly in FIG. 8, to support intake system 10".

Suitable hydraulic rams are provided for raising and lowering intake system 10". These rams can be substantially identical to the hydraulic rams of the embodiment of FIGS. 5 and 6 and, for clarity, are not shown in FIGS. 7 and 8.

Observation compartment 25' is configured substantially the same as in the embodiment of FIGS. 1-6, but is positioned further aft within skimmer craft 8'. Also, as shown in FIG. 7, separation tank 12' takes up a larger portion of the interior of skimmer craft 8'.

As in the embodiment of FIGS. 1-6, a variable depth pump intake 16' is provided in separation tank 12' to pump oil therefrom. However, in the embodiment of FIGS. 7 and 8, the pump system additionally includes an exit tank 97 provided on suction/discharge pipe 18'. Exit tank 97 includes a water steaming system 98 attached to the underside of exit tank 97 for the heating thereof. In use, although adjustable depth pump intake 16' is positioned by the operator to pump substantially only oil from separation tank 12', a small amount of seawater can, nevertheless, enter suction/discharge pipe 18'. This can result from operator error, or can occur if the depth of oil in separation tank 12' is shallow compared to the size of adjustable depth pump intake 16'. In any case, exit tank 97 temporarily stores oil pumped through suction/discharge pipe 18' such that any water inadvertently pumped through suction/discharge 18' settles to the bottom of exit tank 97. Water steamer 98 eliminates the water contained within exit tank 97 by using a heating system such as a blow torch, not shown, for quickly heating the bottom surface of exit tank 97 to a temperature well above the boiling point of water to thereby quickly boil the water within exit tank 97. The water, thus converted into steam, is allowed to escape from exit tank 97 by conventional means, such as a pressure sensitive valve.

An exit pump 99 is provided along with exit tank 97 to pump oil from exit tank 97 to a separate storage tank, such as a barge, for subsequent disposal. Exit pump 99 pumps oil from exit tank 97 through a floating intake port 101 such that only oil is pumped from exit tank 97. Thus exit tank 97, exit pump 99 and water steamer 98 provide a second separation means to supplement the separation capability provided with separation tank 12'.

Centrifugal pump 17', which pumps sea water from the bottom of separation tank 12' back into the sea, further comprises a plurality of venturi grills 100. Each venturi grill 100 includes a plurality of parallel, angled, slot members 102 which connect the bottom of separation tank 12' to the sea. In use, a pressure differential generated between the exterior sea water and separation tank 12' causes water contained within separation tank 12' to be drawn through slotted members 102 and into the sea.

As in the embodiment of FIGS. 1-6, cabin 70' and intake system 10" are removable from skimmer craft 8' to allow for easy transport. In a further embodiment, not shown, skimmer craft 8' is separable into two sections for convenient transport over land or for air freight transport.

Figure 9:
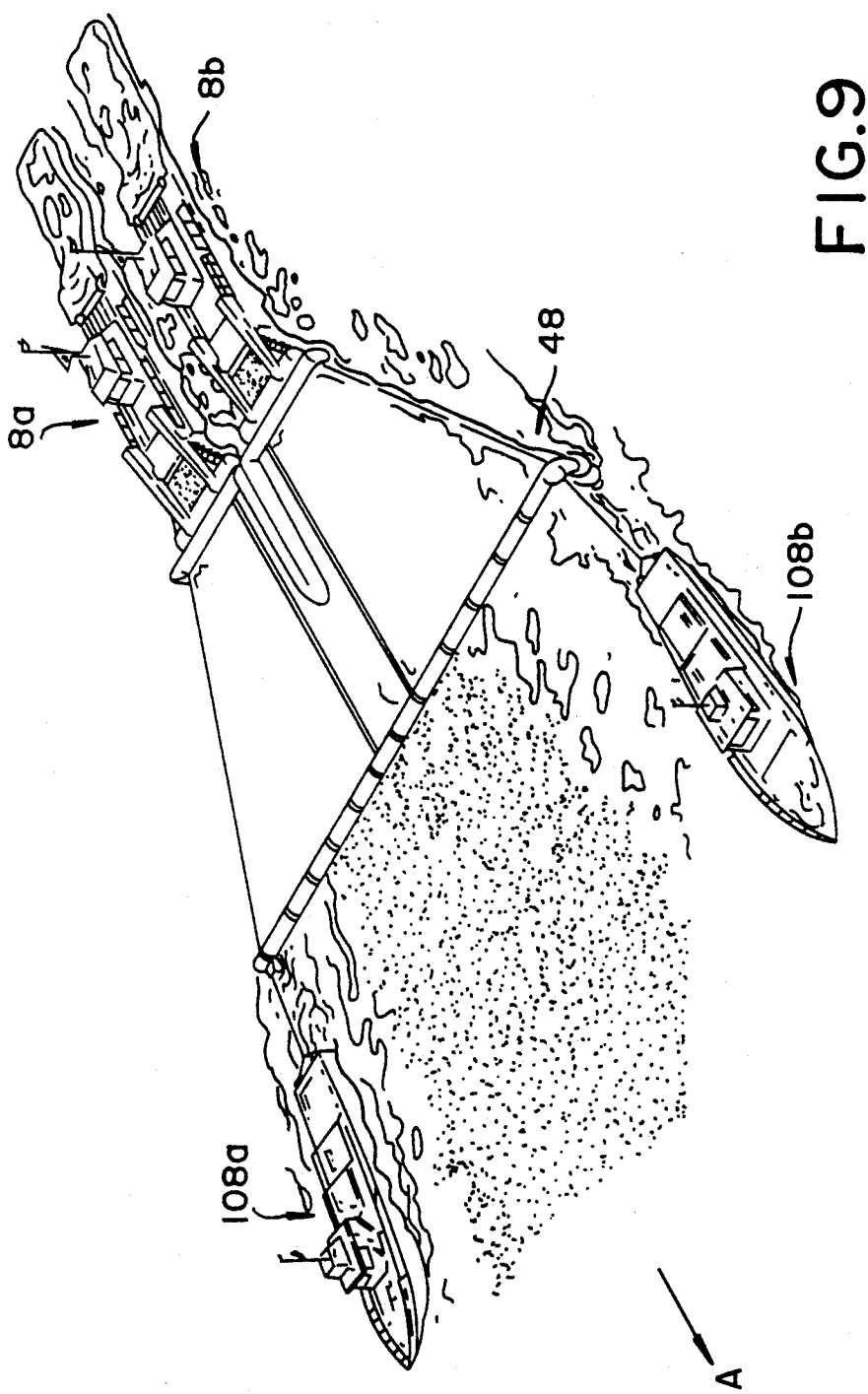
FIG. 9 shows a perspective view of a plurality of skimmer craft constructed in accordance with the embodiment of FIG. 6.
Figure 10:
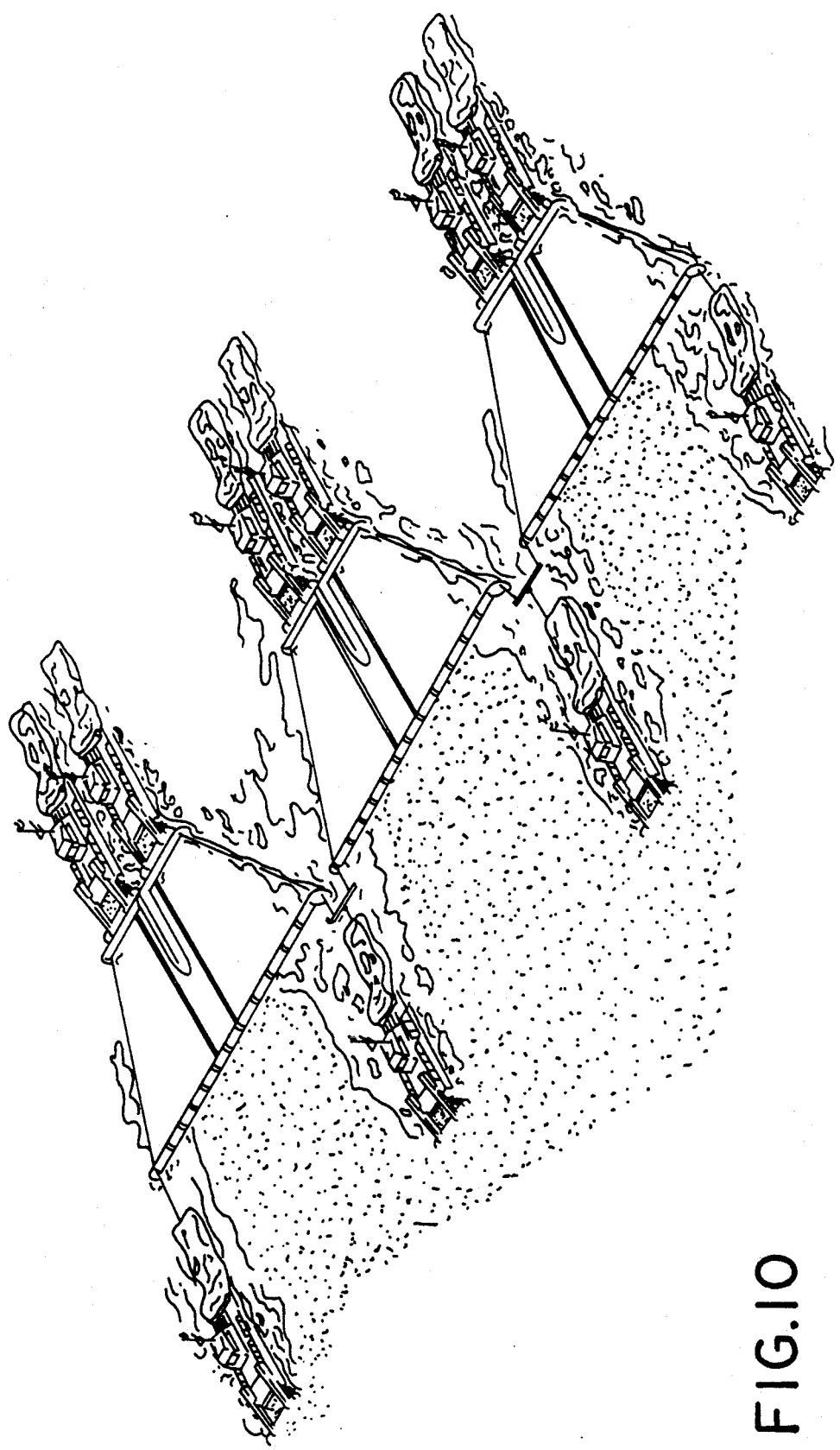
FIG. 10 shows a perspective view of an alternative embodiment of a plurality of skimmer craft also constructed in accordance with the embodiment of FIG. 6.
Figure 11:
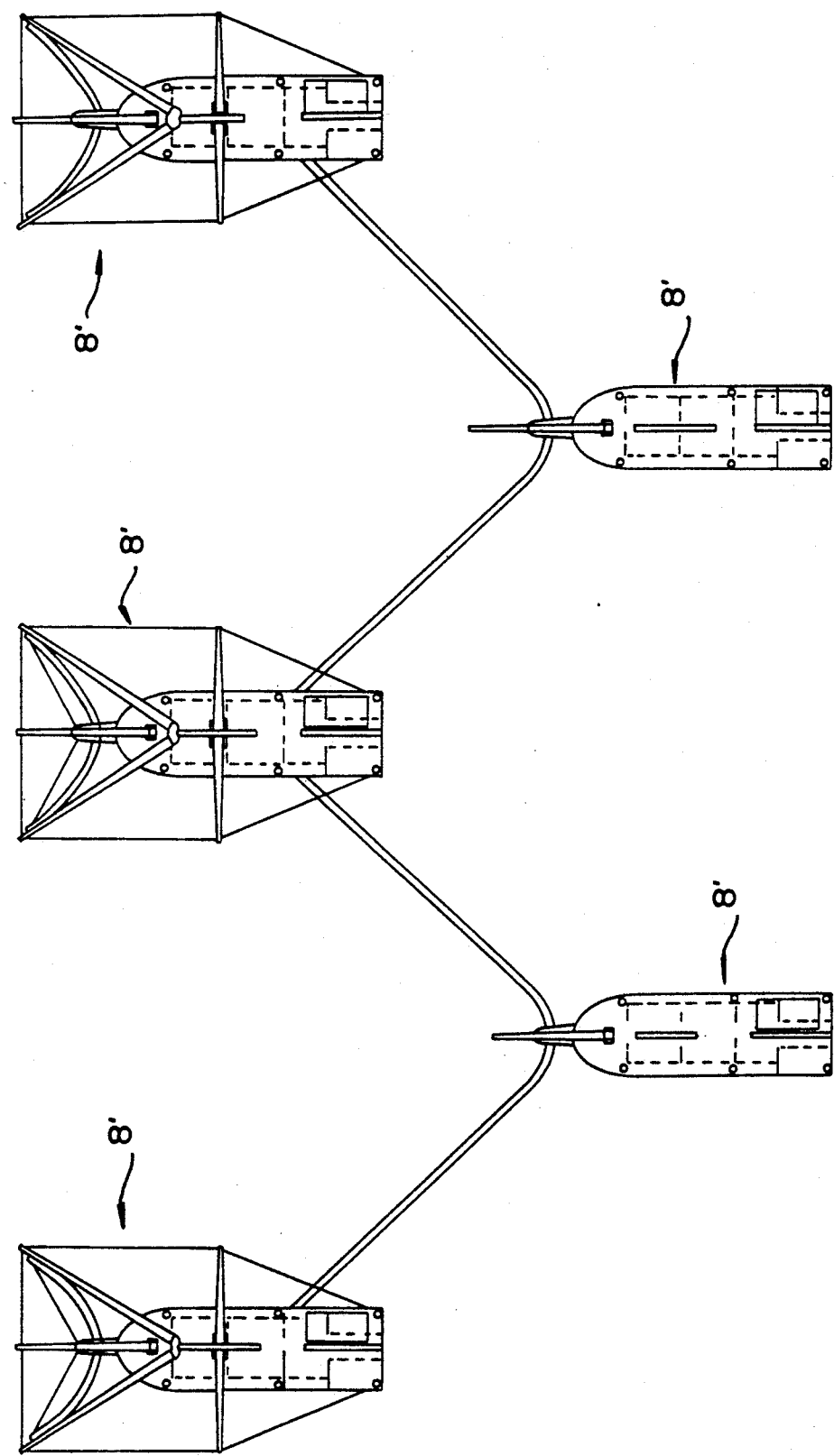
FIG. 11 shows a top plan view of a plurality of skimmer craft constructed in accordance with the embodiment of FIG. 9.

A plurality of skimmer craft can be deployed in spaced relation to increase the rate at which oil is recovered. FIG. 9 shows such a deployment wherein two skimmer craft 8a and 8b are deployed together using an extension intake 48 held open by two workboats, 108a and 108b. In use, as the craft proceed in the direction of arrow A, oil is concentrated by the extension intake 48 into the intake system 10 of skimmer crafts 8a and 8b. Thus, a greater surface area of the oil-spill is efficiently skimmed. Although FIG. 9 shows two skimmer craft deployed, any number of skimmer craft can be deployed, FIG. 10, to increase the rate of oil recovery. As shown in FIG. 11, and similar to the embodiments of FIGS. 9 and 10, a plurlaity of craft 8' can be operated in tandem to increase the rate at which oil is skimmed from the sea.

Thus the invention provides an efficient system for cleaning oil-spills.

In all embodiments, skimmer craft 8 can be utilized both as an oil skimmer and also as a fire fighting boat, lifeboat, pumping station, floating crane, tender, and general work boat.

The improvements described herein can be incorporated into the design of any new, or by modification, into any existing work boat, tender, lifeboat, offshore service boat, ferry or any such similar craft varying in size from 30 to 300 feet.

Although the invention has been described with respect to exemplary embodiments thereof, it will be understood by those skilled in the art that variations and modifications can be effected in these exemplary embodiments without departing from the scope and spirit of the invention.

I claim:

1. A skimmer craft for collecting and separating liquid pollutants spilled on a body of water, said skimmer craft including a separation tank in the bow of the craft, an intake port to the separation tank disposed at the upper forward end of the separation tank, a sea sled comprising an upper planning surface and a lower buoyant member, and bellows mounted on the bow of the craft, said sea sled, bellows and intake port forming a passageway from the body of water into the separation tank, means mounted on said sea sled for raising and lowering the depth of the sea sled in the body of water and for removing the sea sled and bellows from the body of water, storage chambers for storing liquid pollutants, manually vertically adjustable pump means in said separation tank, passageways interconnecting said pump means with said storage chambers and means for determining the depth of the liquid pollutants on the water by observation so as to allow adjustment of the depth of said pump means whereby only the liquid pollutants are transported through the passageways into said storage chambers.

2. A skimmer craft according to claim 1 including water pump means mounted within said separation tank for pumping the body of water from said separation tank.

3. A skimmer craft according to claim 1 wherein said means for determining the depth of the liquid pollutants on the water so as to adjust the depth of said pump means comprises an observation chamber adjacent the separation chamber with a window disposed in the wall between the observation and separation chambers.

4. A skimmer craft according to claim 1 and further including deflection plates mounted adjacent the intake port to deflect upward oil entering the intake port.

5. A skimmer craft according to claim 1 and further including inflatable bags within the sea sled to vary the depth of the sea sled in the body of water.

6. A skimmer craft according to claim 1 wherein the bellows are narrower adjacent the intake port and wider adjacent the sea sled to allows a wider stream of pollutant and water to be funneled into the separation tank.

* * * * *